United States Patent
Ahn

(10) Patent No.: US 8,877,006 B2
(45) Date of Patent: Nov. 4, 2014

(54) METHOD AND APPARATUS FOR PEELING DONOR FILM FROM SUBSTRATE

(75) Inventor: Kyung-Hyun Ahn, Yongin-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 138 days.

(21) Appl. No.: 13/479,077

(22) Filed: May 23, 2012

(65) Prior Publication Data

US 2013/0048223 A1 Feb. 28, 2013

(30) Foreign Application Priority Data

Aug. 26, 2011 (KR) ........................ 10-2011-0085626

(51) Int. Cl.
- *B32B 38/10* (2006.01)
- *B32B 37/00* (2006.01)
- *B32B 43/00* (2006.01)

(52) U.S. Cl.
CPC ................ *B32B 38/10* (2013.01); *B32B 37/00* (2013.01); *B32B 43/00* (2013.01)
USPC .......................................... 156/715; 156/760

(58) Field of Classification Search
USPC ................................................. 156/715, 760
See application file for complete search history.

(56) References Cited

U.S. PATENT DOCUMENTS

| | | | | |
|---|---|---|---|---|
| 5,358,591 A | * | 10/1994 | Candore | 156/707 |
| 5,540,809 A | * | 7/1996 | Ida et al. | 156/760 |
| 6,500,298 B1 | * | 12/2002 | Wright et al. | 156/708 |
| 6,823,920 B2 | * | 11/2004 | Gayoso | 156/540 |
| 6,938,318 B2 | * | 9/2005 | Yotsumoto et al. | 29/403.3 |
| 7,534,544 B2 | * | 5/2009 | Principe et al. | 430/200 |
| 8,029,642 B2 | * | 10/2011 | Hagman | 156/715 |
| 8,137,503 B2 | * | 3/2012 | Hiranaka et al. | 156/703 |
| 8,256,485 B2 | * | 9/2012 | Tillement et al. | 156/758 |

FOREIGN PATENT DOCUMENTS

| | | |
|---|---|---|
| JP | 2008-266016 A | 11/2008 |
| KR | 10-0507583 B1 | 8/2005 |
| KR | 10-0528062 B1 | 11/2005 |
| KR | 10-2006-0029422 A | 4/2006 |

* cited by examiner

*Primary Examiner* — Mark A Osele
*Assistant Examiner* — Nickolas Harm
(74) *Attorney, Agent, or Firm* — Knobbe, Martens, Olson & Bear, LLP

(57) ABSTRACT

A method and an apparatus for peeling a donor film from a substrate are disclosed. In one embodiment, the donor film peeling apparatus includes i) a first roller disposed on a side of the donor film, ii) a second roller disposed on a side of the support at a position corresponding to the first roller and iii) first and second grippers configured to withdraw the donor film and support, respectively. The apparatus may further include i) first and second peeling rollers engaged with the first and second rollers with the donor film and support withdrawn by the first and second grippers being interposed therebetween to support the withdrawn donor film and support, respectively, and ii) an insertion mechanism disposed in at least one of the first and second peeling rollers and inserted between the bonded donor film and support.

9 Claims, 10 Drawing Sheets

METHOD AND APPARATUS FOR PEELING DONOR FILM FROM SUBSTRATE

CROSS-REFERENCE TO RELATED PATENT APPLICATIONS

This application claims the benefit of Korean Patent Application No. 10-2011-0085626, filed on Aug. 26, 2011, in the Korean Intellectual Property Office, the disclosure of which is incorporated herein in its entirety by reference.

BACKGROUND

1. Field

The described technology generally relates to a method and an apparatus for peeling a donor film from a substrate, and more particularly to a method and an apparatus for peeling a donor film and a support laminated on a substrate from the substrate during a laser induced thermal imaging (LITI) process.

2. Description of the Related Technology

Color flat panel displays, such as a liquid crystal display or an organic light emitting diode (OLED) display, generally include a color filter used for providing colors to pixels. One of the technologies for forming a color filter is a laser induced thermal imaging process, which is abbreviated as "LITI".

SUMMARY

One inventive aspect is a method and an apparatus for effectively peeling a used donor film from the substrate after donor materials are transferred to a substrate from the donor film.

Another aspect is a method and an apparatus for peeling a donor film, by which the donor film is peeled from a substrate without leaving stains on the substrate.

Another aspect is a method and an apparatus for peeling a donor film from a substrate.

Another aspect is an apparatus for peeling a support and a donor film, which are bonded to each other with the substrate being interposed therebetween to seal the substrate, from the substrate.

Another aspect is an apparatus for peeling a donor film and a support bonded to each other with a substrate being interposed therebetween from the substrate, wherein the apparatus includes: a first roller disposed on a side of the donor film; a second roller disposed on a side of the support at a position corresponding to the first roller; a first gripper for withdrawing the donor film; a second gripper for withdrawing the support; a first peeling roller engaged with the first roller with the donor film withdrawn by the first gripper being interposed therebetween to support the withdrawn the donor film; a second peeling roller engaged with the second roller with the support withdrawn by the second gripper being interposed therebetween to support the withdrawn the support; and insertion means (or an insertion mechanism) disposed in at least one of the first peeling roller and the second peeling roller and inserted between the bonded donor film and support.

Another aspect is an apparatus for peeling a used donor film after performing the transfer with the LITI method by using the donor film. In one embodiment, a separate film is introduced as a support to seal the substrate with the donor film and the support, the transfer is performed, and then the donor film is peeled, with an application of the LM method using the donor film.

According to an embodiment, the substrate is a substrate for a display unit of a display device.

According to an embodiment, the substrate is a substrate for a display unit of an Organic Light Emitting Diode (OLED) display.

According to an embodiment, the donor film is a donor film for a Laser Induced Thermal Imaging (LITI).

According to an embodiment, the donor film is a donor film for forming color pixels of a display device.

According to an embodiment, the display device is a Liquid Crystal Display (LCD) or an organic light emitting device.

According to an embodiment, the donor film and the support have a form of a flexible film.

According to an embodiment, the support is formed of a polymer film.

According to an embodiment, the support is attached to the substrate to serve as a support for protecting the substrate during the LITI.

According to an embodiment, the insertion means are disposed at opposite ends of at least one of the first peeling roller and the second peeling roller.

According to an embodiment, the donor film and the support have areas larger than an area of the substrate, the donor film and the support are directly bonded to each other in a region outside the substrate, and the insertion means are inserted into parts where the donor film and the support are directly bonded to each other.

According to an embodiment, the insertion means are disposed in both the first peeling roller and the second peeling roller, and include first insertion means disposed in the first peeling roller and second insertion means disposed in the second peeling roller.

According to an embodiment, the first insertion means are disposed at opposite ends of the first peeling roller and the second insertion means are disposed at opposite ends of the second peeling roller.

According to an embodiment, the insertion means is a blade or a roller.

According to an embodiment, at least one of the first insertion means and the second insertion means is a blade.

According to an embodiment, at least one of the first insertion means and the second insertion means is a roller.

According to an embodiment, the roller has a diameter ranging from about 5 mm to about 20 mm.

According to an embodiment, the apparatus further includes a donor film winding roller for winding the donor film withdrawn by the first gripper and a support layer winding roller for winding the support withdrawn by the second gripper.

According to an embodiment, the apparatus further includes at least one of: a first nip roller spaced apart from the first peeling roller and engaged with the first roller with the donor film withdrawn by the first gripper being interposed therebetween to support the withdrawn donor film; and a second nip roller spaced apart from the second peeling roller and engaged with the second roller with the support withdrawn by the second gripper being interposed therebetween to support the withdrawn support.

According to an embodiment, the first peeling roller and the first nip roller interwork with each other through a first belt and the first belt is engaged with the first roller to support the withdrawn donor film.

According to an embodiment, the first belt is formed only in a part corresponding to a position where the insertion means is inserted.

According to an embodiment, the second peeling roller and the second nip roller interwork with each other through a second belt and the second belt is engaged with the second roller to support the withdrawn support.

According to an embodiment, the second belt is formed only in a part corresponding to a position where the insertion means is inserted.

According to an embodiment, the apparatus further includes a fust nip roller spaced apart from the first peeling roller and engaged with the first roller with the donor film withdrawn by the first gripper being interposed therebetween to support the withdrawn donor film, wherein the insertion means are rollers and are disposed at opposite ends of the first peeling roller, and the first nip roller, the first peeing roller, and the insertion means interwork with each other by a first belt.

According to an embodiment, the first belt is formed only in a part corresponding to a width of the insertion means.

According to an embodiment, the apparatus further includes a second nip roller spaced apart from the second peeling roller and engaged with the second roller with the support withdrawn by the second gripper being interposed therebetween to support the withdrawn support, wherein the insertion means are rollers and disposed at opposite ends of the second peeling roller, and the second nip roller, the second peeing roller, and the insertion means interwork with each other through a second belt.

According to an embodiment, the second belt is formed only in a part corresponding to a width of the insertion means.

Another aspect is a method of peeling a donor film and a support, which are bonded to each other with a substrate being interposed therebetween, from the substrate by using the donor film peeling apparatus. The method of peeling a donor film and a support from a substrate includes disposing a bonded body of the donor film and the support, which are bonded to each other with the substrate being interposed therebetween, between the first roller and the second roller; withdrawing a distal end portion of the donor film by using a first gripper and withdrawing a distal end portion of the support by using a second gripper from an end of the bonded body of the donor film and the support, which are bonded to each other with the substrate being interposed therebetween; disposing the first peeling roller such that the first peeling roller is engaged with the first roller with the withdrawn donor film being interposed therebetween; disposing the second peeling roller such that the second peeling roller is engaged with the second roller with the withdrawn support being interposed therebetween; inserting the insertion means between the donor film and the support; and rotating the first roller and the second roller and withdrawing the donor film and the support by using the first gripper and the second gripper while carrying the substrate, to peel the donor film and the support from the substrate.

According to an embodiment, the method is performed in a chamber.

According to an embodiment, the disposing of the first peeling roller and the disposing of the second peeling roller are simultaneously performed or one of disposing of the first peeling roller and disposing of the second peeling roller is performed first.

According to an embodiment, the disposing of the first peeling roller and disposing of the second peeling roller may be performed under the vacuum atmosphere, together with a subsequent step.

According to an embodiment, rotation speeds of the first roller and the first peeling roller correspond to a withdrawal speed of the donor film.

According to an embodiment, rotation speeds of the second roller and the second peeling roller correspond to a withdrawal speed of the support.

DETAILED DESCRIPTION

Figure 1:
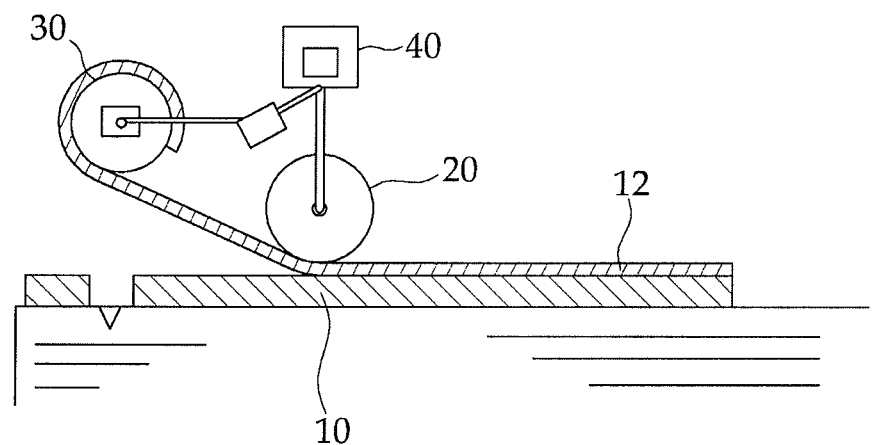
FIG. 1 illustrates an example of a donor film peeling apparatus.

FIG. 1 schematically illustrates an example of an LITI method. Specifically, a donor film 12 is first disposed on a substrate 10. In manufacturing a color filter, the substrate 10 is typically formed of glass having a planar shape. The donor film 12 is generally a sheet which is relatively thin and flexible in comparison with the substrate 10. The donor film 12 is generally formed of, for example, plastic. The donor film 12 contains donor materials. Typical donor materials include colorants, pigments, etc. used for manufacturing the color filter.

After the donor materials have been transferred to the substrate 10 from the donor film 12 by laser heat, the used donor film 12 is removed from the substrate 10. For example, in manufacturing a color filter, a donor film for applying a red colorant on the substrate 10, a donor film for applying a green colorant on the substrate 10, and a donor film for applying a blue colorant on the substrate 10 are often used. After usage, each donor film is removed from the substrate 10 before a subsequent donor film is applied to the substrate.

Although the transferred donor materials should be completely bonded to a corresponding part of the substrate 10, sometimes they are only partially bonded to the donor film. As such, partial bonding may cause difficulty in peeling the donor film 12 from the substrate 10.

FIG. 1 illustrates an apparatus for peeling the donor film 12 from the substrate 10 by using rollers. The apparatus includes a peeling roller 20, a winding roller 30 including a fixing mechanism for fixing a first part of the donor film including an edge of the donor film to the winding roller 30, a chassis 40 for supporting the peeling roller 20 and the winding roller 30 such that the peeling roller 20 is rotatable with respect to the chassis 40 and the winding roller 30 is movable and rotatable with respect to the chassis 40, and a controller (not shown). Further, the controller causes the chassis 40 to move relative to the substrate 10 such that the peeling roller 20 is positioned in a vicinity of a second part of the donor film 12. The second part is spaced apart from the edge of the donor film 12 and the vicinity of the second part is close enough to the donor film 12 to maintain a contact state between the second part of the donor film 12 and the substrate 10.

In FIG. 1, while maintaining the position of the peeling roller 20 at the vicinity of the second part of the donor film 12, the controller causes the winding roller 30 to move relative to the substrate 10 to move the winding roller 30 and the first part of the donor film 12 fixed to the winding roller 30 away from the substrate 10, and causes the peeling roller 20 to move relative to the substrate 10 in a direction tangential to the substrate 10 to rotate the winding roller 30 around an axis of the winding roller 30 so that at least a considerable part of the donor film 12 is peeled from the substrate 10.

The apparatus of FIG. 1 is suitable for a construction in which the donor film is simply laminated on the substrate. Meanwhile, in a recent LITI process illustrated in FIG. 2, a donor film 110 is laminated on a substrate while matching with a carrying support 120 and sealing the substrate. Therefore, a method of peeling a donor film includes a method of peeling a donor film through blowing of nitrogen gas or air between a donor film and a substrate (see FIG. 3) or a method of peeling a donor film simply by a tension of a gripper on a typical roll.

However, in the method of blowing nitrogen gas or air between the donor film and the substrate, since the donor film is laminated after being sealed on a tray, it is difficult to control a process, such as adjustment of a peeling angle between the donor film and the substrate by using a roll. Further, since nitrogen gas or air should be blown toward the film laminated on the substrate, the method may influence the substrate and a transfer quality. Especially, if peeling and blowing are unevenly performed, a peeling stain may be caused due to momentary generation of bubbles, etc.

In the meantime, in the method of simply using a tension, it is difficult to uniformly control a force applied to the gripper and the roll part, and the film may fail to be closely attached to the roll due to a fine difference between a speed of pulling the donor film by the gripper and a rotation speed of the roll for the peeling, causing a failure of the peeling, etc.

Hereinafter, embodiments will be described in more detail with reference to the accompanying drawings.

The same reference numerals indicate the same or like elements throughout the specification. The terms in the present application are used only to describe the specific embodiments, and are not intended to limit the present invention. An expression of a singular form includes an expression of a plural form unless otherwise indicated.

Figure 4:
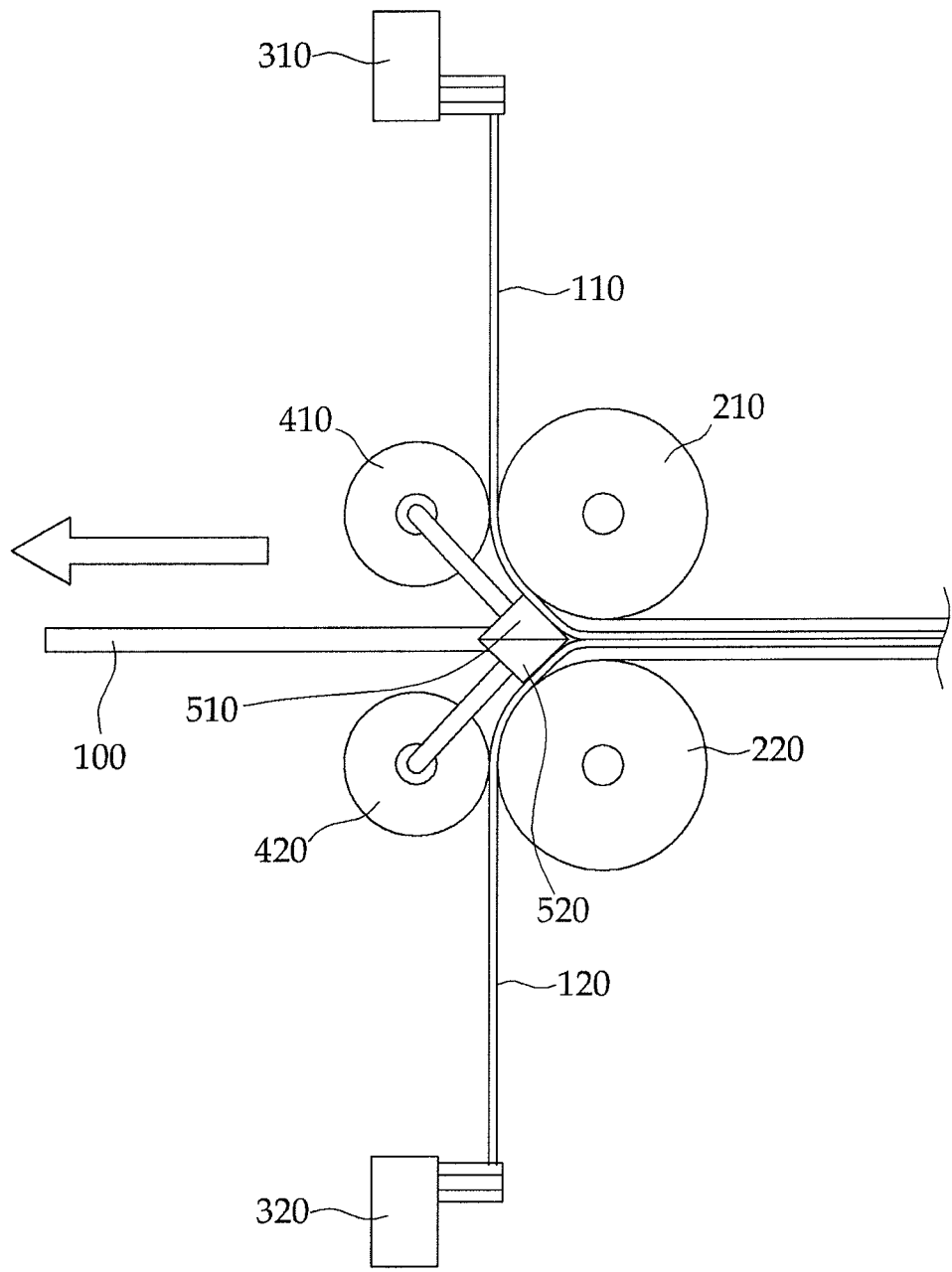
FIG. 4 illustrates a donor film peeling apparatus according to one embodiment.

One embodiment is a donor film peeling apparatus for peeling a donor film and a support, which are bonded to each other with a substrate being interposed therebetween, from the substrate. FIG. 4 illustrates a donor film peeling apparatus according to one embodiment. The apparatus includes i) a first roller 210 disposed on a side of the donor film, ii) a second roller 220 disposed on a side of the support at a position corresponding to the first roller 210, iii) a first gripper 310 for withdrawing the donor film and iv) a second gripper 320 for withdrawing the support. The apparatus further includes i) a first peeling roller 410 engaged with the first roller 210 with the donor film withdrawn by the first gripper 310 being interposed therebetween to support the withdrawn donor film, ii) a second peeling roller 420 engaged with the second roller 220 with the support withdrawn by the second gripper 320 being interposed therebetween to support the withdrawn support and iii) insertion means (or insertion mechanism) 510 or 520 disposed in at least one of the first and second peeling rollers 410 and 420 and inserted between the bonded donor film and support.

The donor film peeling apparatus may peel not only the donor film 110 but also the support 120, which are bonded to each other with the substrate 100 being interposed between the donor film 110 and the support 120, but is referred to as the donor film peeling apparatus for convenience's sake.

The insertion means may be disposed in at least one of the first and second peeling rollers 410 and 420. However, FIG. 4 illustrates an example in which the insertion means are disposed in both the rollers 410 and 420. For example, the insertion means disposed in the first peeling roller 410 is the first insertion means 510 and the insertion means disposed in the second peeling roller 420 is the second insertion means 520. The insertion means 510 and 520 illustrated in FIG. 4 are shaped like a blade.

The substrate 100 may be a substrate in which a display unit of a display device is disposed. That is, the substrate 100 may be a glass substrate for forming a thin film transistor (TFT), an electrode, a light emitting unit, or a liquid crystal display in manufacturing a display panel. In this case, the TFT, the electrode, etc. may be formed on the substrate 100. Specifically, the substrate 100 may be a substrate for an OLED display.

The donor film 110 may be a donor film for LITI. That is, the donor film peeling apparatus may be used as an apparatus for peeling a donor film after performing the LITI for a corresponding region of the substrate by using the donor film for the LITI.

In this case, the donor film may be a donor film for forming color pixels of a display device. Any display device including, but not limited to, an LCD and an organic light emitting device, can be used for displaying an image by using an electric-electronic method.

Hereinafter, for simplicity of the description, each element will be described based on the donor film peeling apparatus in which the donor film 110 is disposed on the substrate 100, the LITI is performed, and then the donor film 110 is peeled from the substrate 100, in order to form color pixels in an organic light emitting device.

The support 120 is disposed in an opposite surface of the substrate 100. The support 120 is attached to the substrate 100 so that it may serve as a carrying support for protecting the substrate during the LITI process. The support 120 is mainly used as the carrying support, so it is also referred to as the carrying support.

Referring to FIG. 4, the donor film 110 and the support 120 have a form of a flexible film. The support 120 may be formed of a polymer film. The insertion means may be disposed at opposite ends of at least one of the first peeling roller 410 and the second peeling roller 420.

Referring to FIG. 4, the insertion means 510 and 520 are disposed in both the first and second peeling rollers 410 and 420, and it can be seen that the insertion means 510 and 520 are disposed at opposite ends of each of the rollers 410 and 420. That is, the first insertion means 510 are disposed at opposite ends of the first peeling roller 410 and the second insertion means 520 are disposed at opposite ends of the second peeling roller 420.

Here, referring to an attachment state of the substrate 100, the donor film 110, and the support 120, the donor film 110 is bonded to the support 120 with the substrate 100 being interposed therebetween, and the LITI is performed with the donor film being sealed. In this regard, a section of an attachment state of the substrate 100, the donor film 110, and the support 120 can be referred to.

Figure 2:
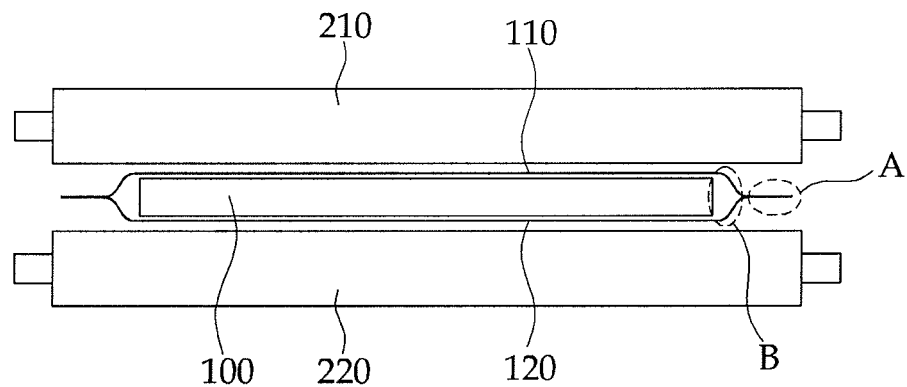
FIG. 2 illustrates a section of a substrate, a donor film, and a support, which are attached to each other.

The donor film 110 and the support 120 used for the LITI have areas larger than that of the substrate 100, and are directly attached to each other in a region outside the substrate 100. In FIG. 2, part "A" is a part where the donor film 110 and the support 120 are directly bonded to each other and parts "A" and "B" correspond to the regions outside the substrate 100.

In order to easily peel the donor film 110 and the support 120 from the substrate 100, it is preferred that they are separated from each other in part B of FIG. 2. It is necessary to separate in advance the donor film and the support from each other in part B before they are withdrawn by the gripper and make a tension generated when the gripper pulls the donor film or the support uniform. If the tension is uneven, a force of peeling the donor film from the substrate may be uneven. Therefore, a part to be transferred and a part not to be transferred fail to be clearly separated, thereby generating stains on the substrate.

For reference, when the donor film is peeled from the substrate, a force of pushing the donor film by the engagement of the first roller and the first peeling roller and a force of pulling the donor film by the first gripper should be balanced for the clear peeling of the donor film from the substrate. However, in part A in FIG. 2, the donor film 110 is relatively strongly bonded to the support 120. Because of this, a force necessary for withdrawing the donor film in part A may be different from a force necessary for withdrawing the donor film in another part. Thus, through separating the donor film from the support in part A by using the insertion means, it is possible to adjust the force necessary for withdrawing the donor film to a similar level.

Figure 3:
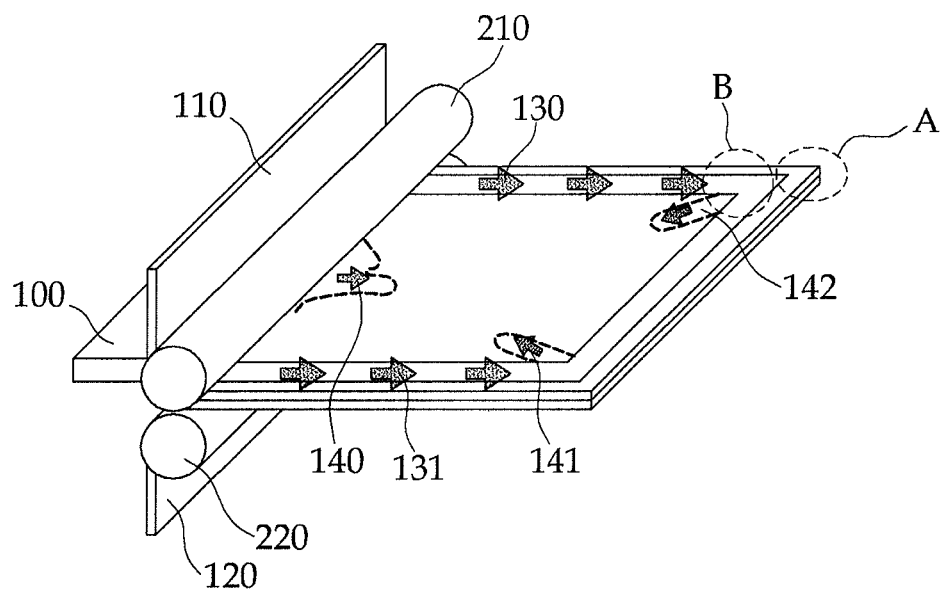
FIG. 3 illustrates an example of a method of peeling a donor film through blowing of nitrogen gas or air.

In a process of peeling the donor film 110 from the substrate 100, gas may be present between the substrate 100 and the donor film 110 or between the substrate 100 and the support carrier 120. Further, air, and the like may be introduced into a gap between the substrate 100 and the donor film 110 or a gap between the substrate 100 and the support 120. For example, as illustrated in FIG. 3, air may be introduced 130 through a space of part B in FIG. 2. Such the air introduction is schematically indicated with arrows 130 in FIG. 3.

In one embodiment, the first and second rollers 210 and 220 are used in the process of peeling the donor film from the substrate, and each of the two rollers 210 and 220 serve to press the donor film and the support toward the substrate. In this case, gas existing between the substrate and the donor film or the substrate and the support may also flow to other parts 140, 141, and 142, and such a flow of gas may cause stains, etc. on a transfer surface of the substrate. For example, when the gas flows to a boundary between a transferred part and a non-transferred part of the donor film, hampering the transferred part and the non-transferred part from being properly separated from each other or causing a transfer layer to be separated in a region other than a desired boundary, stains may be caused on a transfer surface of the substrate.

Therefore, if the donor film 110 and the support 120 in part A are separated by the insertion means 510 and 520 and vacuuming is performed, gas may be prevented from being introduced further between the substrate and the donor film any longer and the gas existing between the substrate and the donor film may be removed. That is, it is possible to prevent the air from being pushed 140, 141, and 142 by the air introduction 130 and 131 indicated with arrows in FIG. 3.

The insertion means should be inserted between the donor film 110 and the support 120 in part A where the donor film 110 is directly bonded to the support 120. The insertion means may have a shape with which it may be easily inserted even into the bonded part. For example, the shape of the insertion means may be shaped like a blade and a roller. That is, the insertion means may be a blade or a roller.

At least one of the insertion means 510 and 520 may be a blade. That is, both the insertion means 510 and 520 may be a blade or only one of the insertion means 510 and 520 may be a blade.

FIG. 4 illustrates an example of the donor film peeling apparatus in which both the first and second insertion means 510 and 520 are shaped like a blade.

Figure 5:
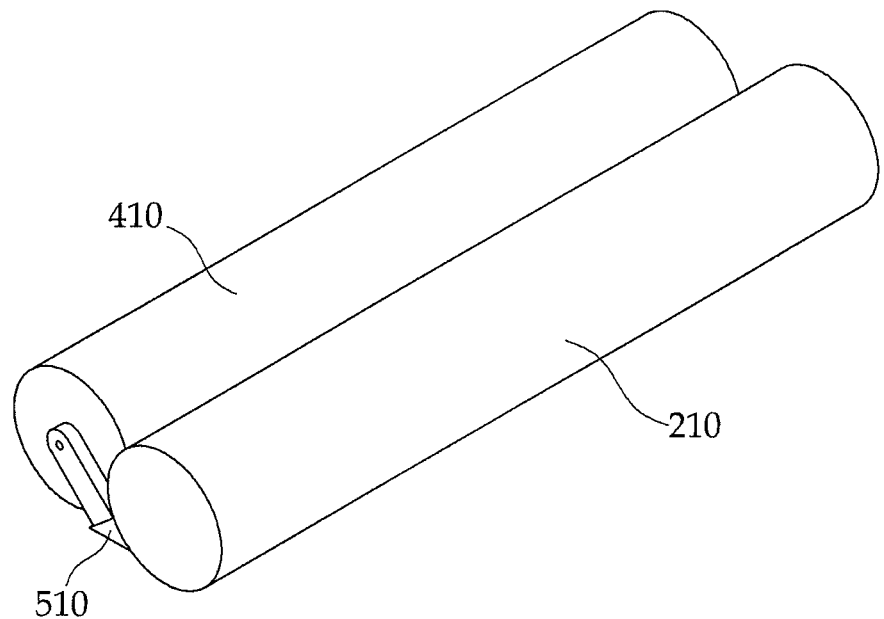
FIG. 5 illustrates a first roller, a first peeling roller, and first insertion means shaped like a blade.

FIG. 5 illustrates the first roller 210, the first peeling roller 410, and the blade-shaped first insertion means 510 disposed in the first peeling roller 410.

At least one of the first and second insertion means 510 and 520 may be a roller. That is, both the insertion means 510 and 520 may be a roller or only one of the two insertion means 510 and 520 may be a roller.

Figure 6:
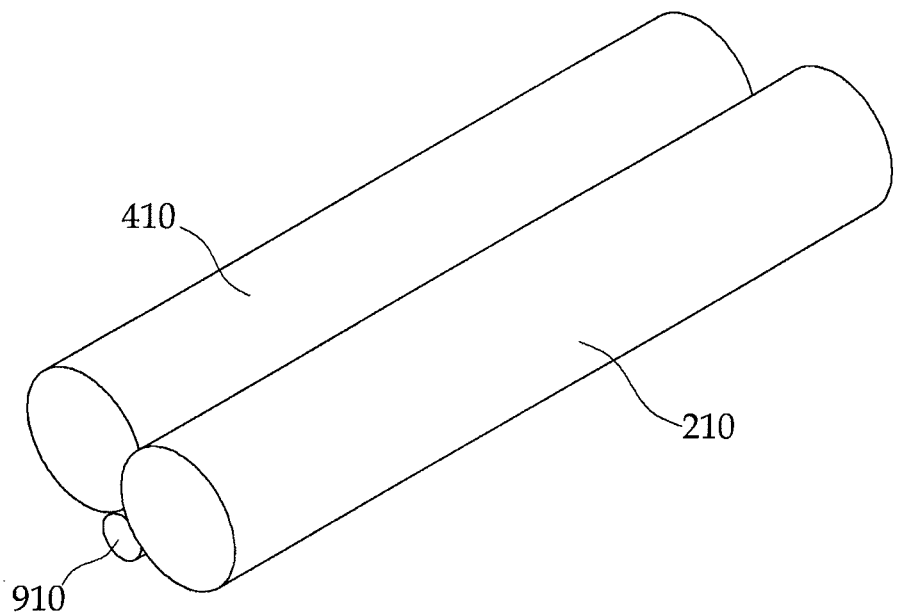
FIG. 6 illustrates a first roller, a first peeling roller, and rollers serving as first insertion means.

FIG. 6 illustrates the first roller 210, the first peeling roller 410, and roller-shaped first insertion means 910 disposed in the first peeling roller 410.

In one embodiment, the diameter of the roller-shaped first insertion means 910 is sized such that the rollers are inserted between the donor film 110 and the support 120 in part A in which the donor film 110 is directly bonded to the support 120. In another embodiment, the diameter of the roller-shaped first insertion means 910 is sized so as to avoid difficulty in rotating the rollers and prevent the rollers from being broken or bent. The diameter of the roller 910 may be from about 5 mm to about 20 mm.

The donor film peeling apparatus further includes at least one of a donor film winding roller 610 for winding the donor film withdrawn by the first gripper and a support layer winding roller 620 for winding the support withdrawn by the second gripper.

Figure 7:
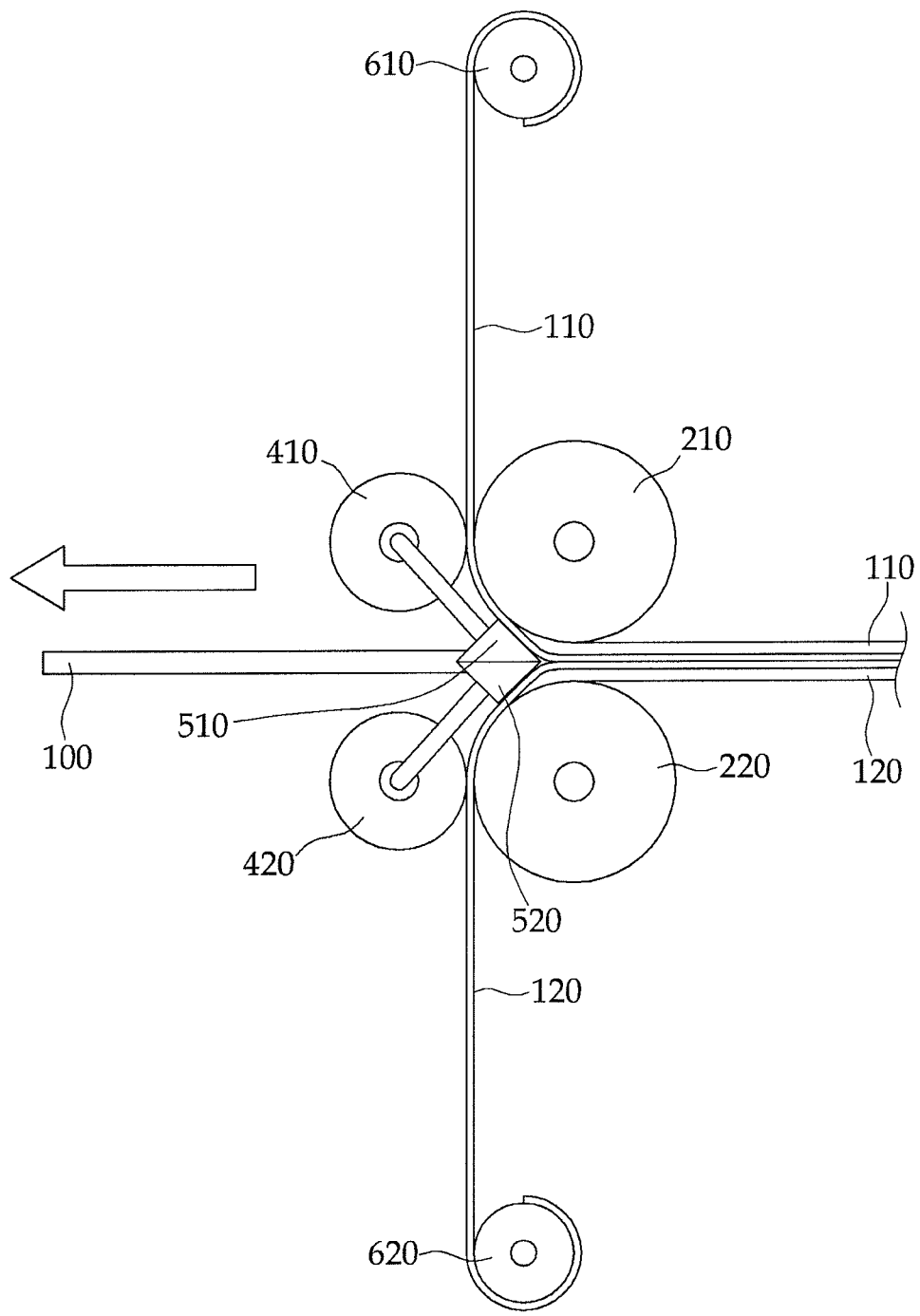
FIG. 7 illustrates an example of a donor film peeling apparatus further including a donor film winding roller and a support layer winding roller.

FIG. 7 illustrates an example of the donor film peeling apparatus including both the donor film winding roller 610 and the support layer winding roller 620. The gripper is not shown in FIG. 7.

The donor film peeling apparatus further includes at least one of a first nip roller 710 spaced apart from the first peeling roller 410 and engaged with the first roller 210 with the donor film 110 withdrawn by the first gripper 310 being interposed therebetween to support the withdrawn donor film 110, and a second nip roller 720 spaced apart from the second peeling roller 420 and engaged with the second roller 220 with the support 120 withdrawn by the second gripper 320 being interposed therebetween to support the withdrawn the support 120.

Figure 8:
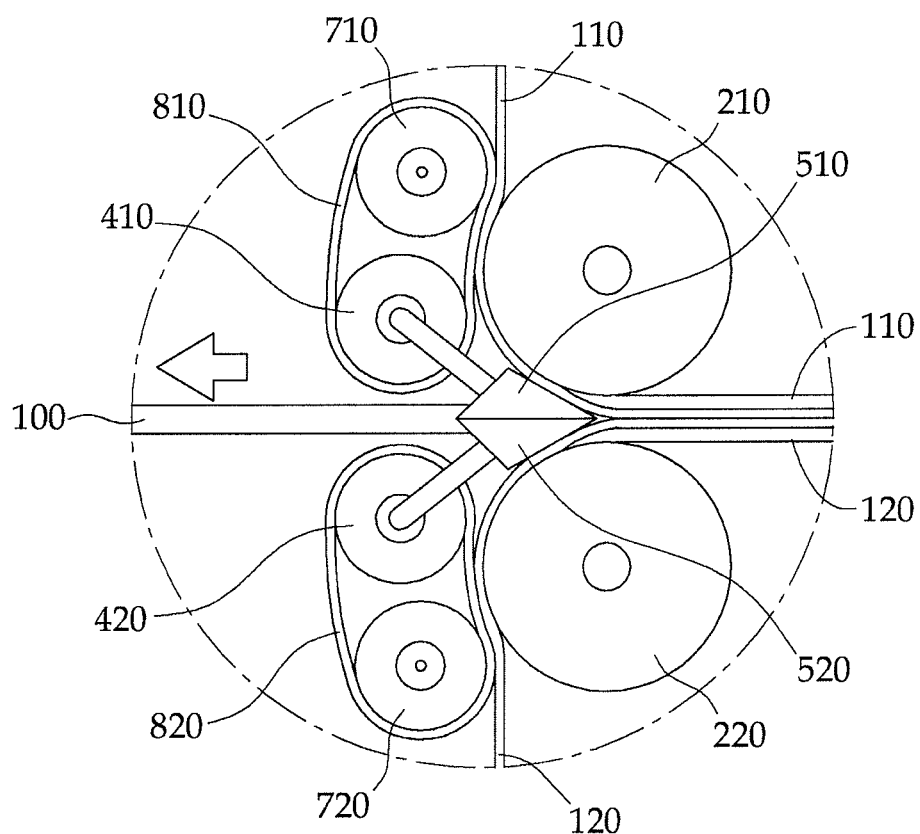
FIG. 8 illustrates an example of a donor film peeling apparatus further including a first nip roller and a second nip roller.
Figure 9:
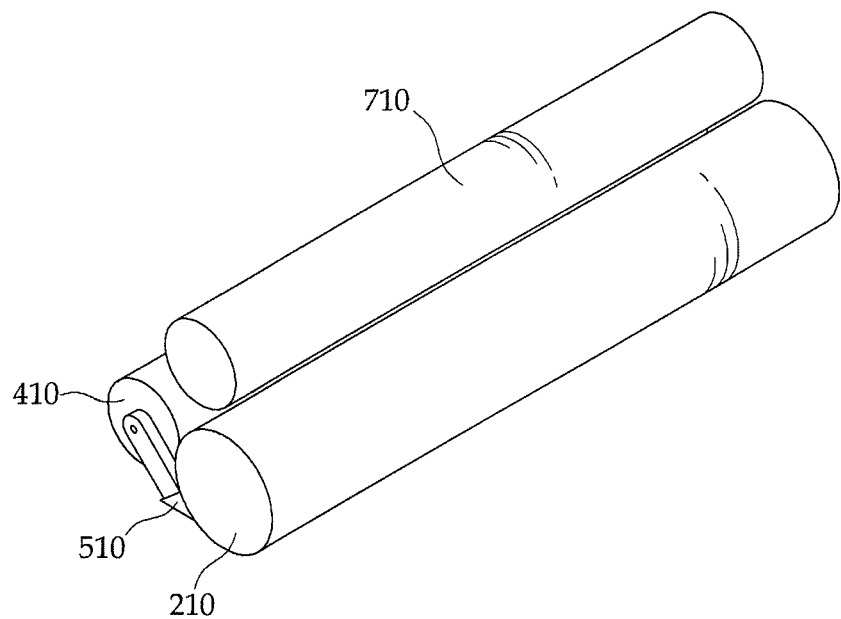
FIG. 9 illustrates a first roller, a first peeling roller, first insertion means, and a first nip roller.
Figure 13:
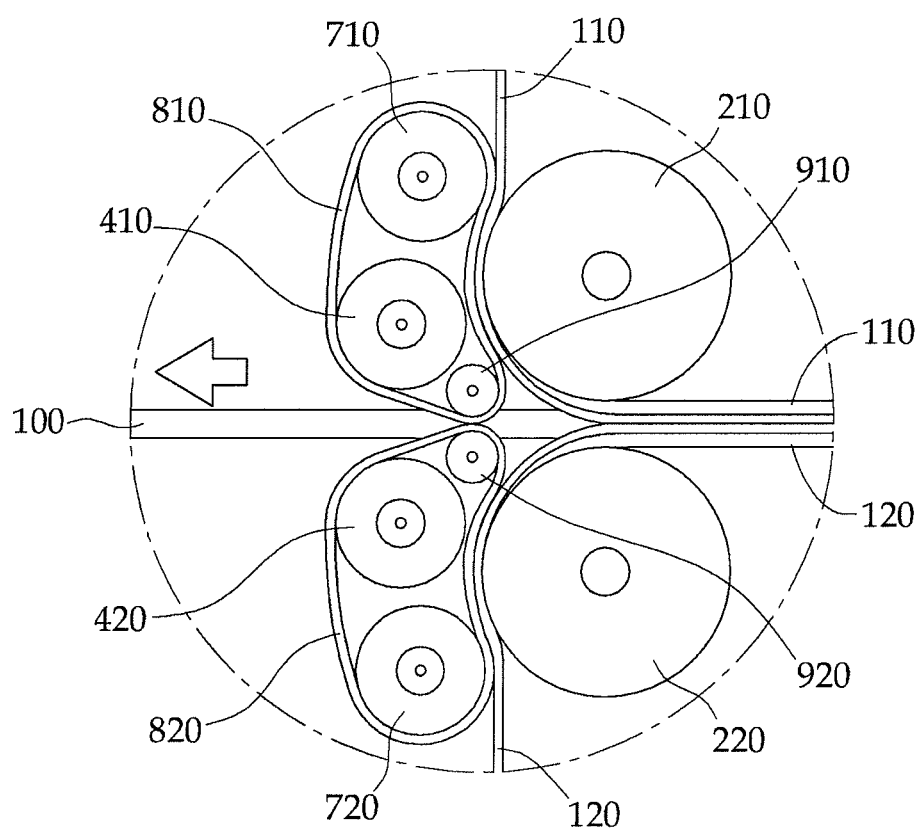
FIG. 13 illustrates an example of a donor film peeling apparatus including rollers, peeling rollers, nip rollers, and insertion means shaped like a roller, in which the peeling roller, the nip roller, and the insertion means shaped like a roller interwork with each other through a belt.

FIGS. 8 and 13 illustrate examples of the donor film peeling apparatus including both the first nip roller 710 and the second nip roller 720. FIG. 9 illustrates the first roller 210, the first peeling roller 410, the blade-shaped first insertion means 510 disposed in the first peeling roller 410, and the first nip roller 710.

Referring to FIGS. 1 and 8, the first peeling roller and the first nip roller interwork with each other through a first belt 810. In this case, the first belt 810 is engaged with the first roller to support the withdrawn donor film.

Referring to FIG. 8, the second peeling roller 420 and the second nip roller 720 interwork with each other through a second belt 820, and the second belt 820 is engaged with the second roller 220 to support the withdrawn support 120.

The first belt 810 and the second belt 820 may be formed along substantially the entire length of the peeling roller and the nip roller, or may be formed only at parts corresponding to positions where the insertion means are inserted, among the entire length of the peeling roller and the nip roller.

Figure 10:
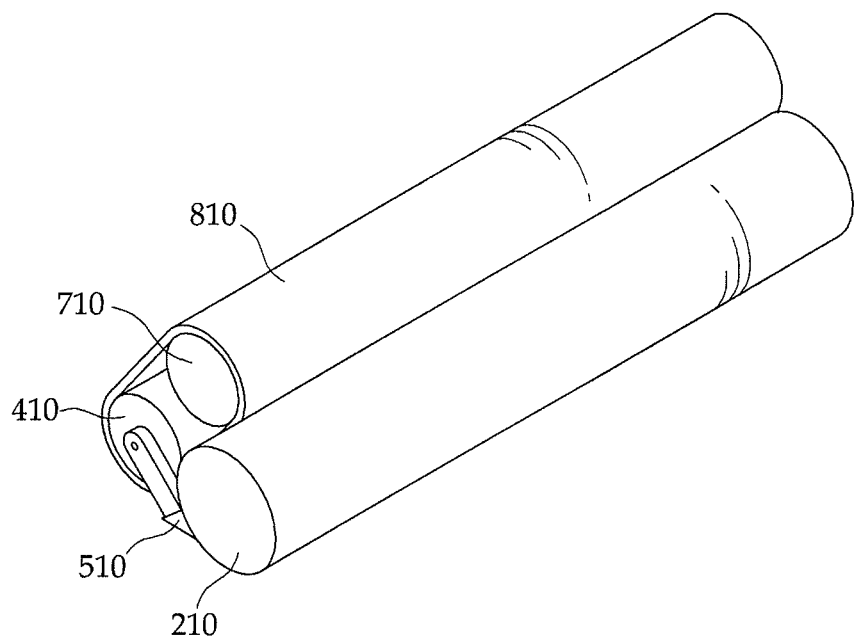
FIG. 10 illustrates a first belt formed along an entire length of a first peeling roller and a first nip roller, a first roller, a first peeling roller, first insertion means, and a first nip roller.

FIG. 10 illustrates the first roller 210, the first peeling roller 410, the blade-shaped first insertion means 510 disposed in the first peeling roller 410, and the first nip roller 710. The first peeling roller 410 and the first nip roller 710 interwork with each other through the first belt 810, and the first belt 810 is formed along an entire length of the peeling roller and the nip roller.

Figure 11:
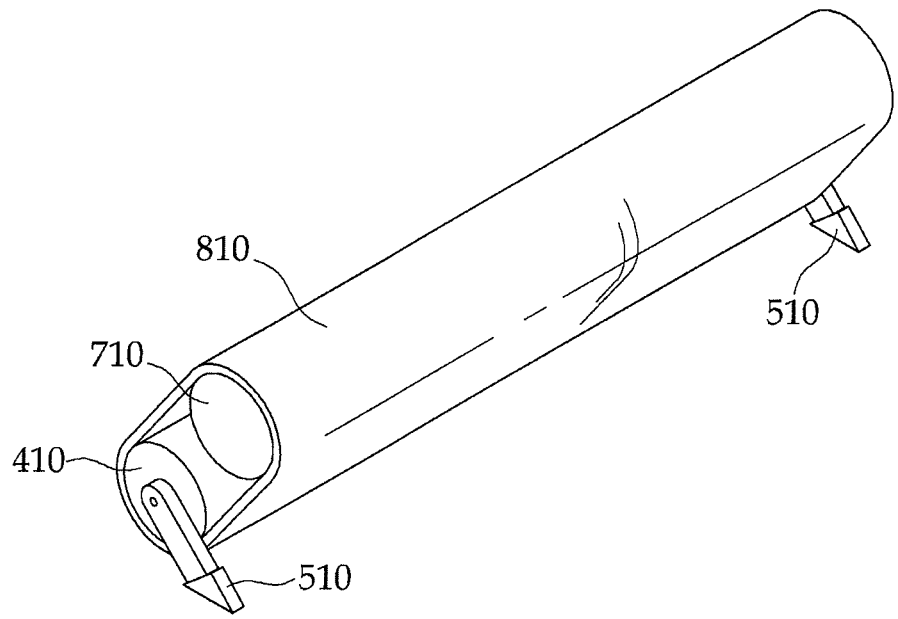
FIG. 11 illustrates a first belt formed along an entire length of a first peeling roller and a first nip roller, a first peeling roller, first insertion means, and a first nip roller.

FIG. 11 illustrates the first peeling roller 410, the blade-shaped first insertion means 510 disposed in the first peeling roller 410, the first nip roller 710, and the first belt 810 formed along an entire length of the first peeling roller 410 and the first nip roller 710.

The first nip roller and the second nip roller serve as auxiliary supports for the first peeling roller and the second peeling roller. Therefore, the first nip roller and the second nip roller may not be formed in a length corresponding to the entire length of the first peeling roller and the second peeling roller. Even if the first nip roller and the second nip roller support the donor film 110 and the support 120 only at opposite widthwise ends thereof when the donor film 110 and the support 120 are withdrawn, it is possible to obtain excellent withdrawal characteristics.

Figure 12:
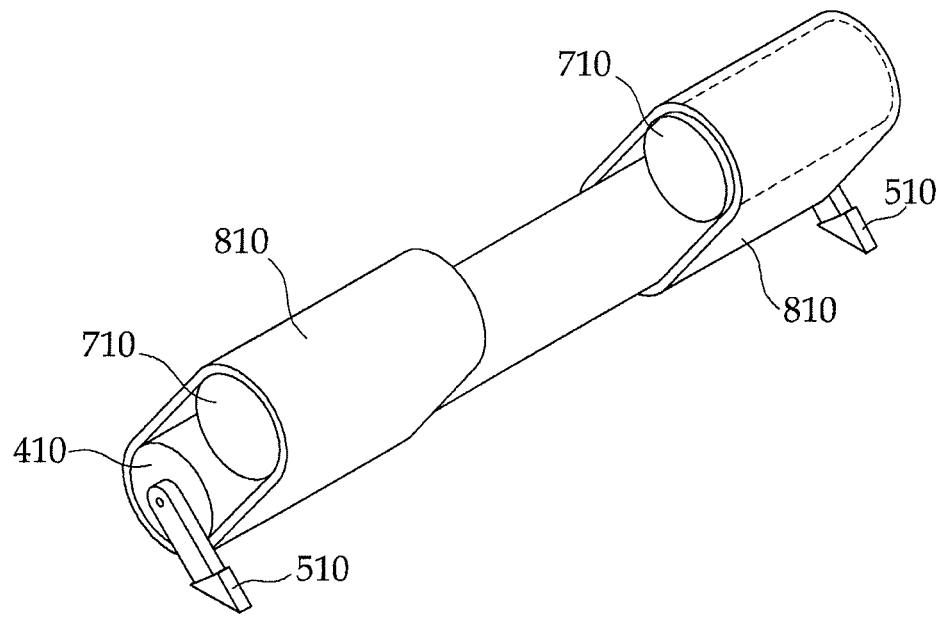
FIG. 12 illustrates an example of a first peeling roller, first insertion means, and first nip rollers and first belts formed only at parts corresponding to positions where the first insertion means are inserted.

FIG. 12 illustrates the first peeling roller 410, the blade-shaped first insertion means 510 disposed in the first peeling roller 410, the first nip roller 710, and the first belt 810. It can be seen that the first nip roller 710 and the first belt 810 are formed only at parts corresponding to positions where the insertion means are inserted.

FIG. 13 illustrates an example of the donor film peeling apparatus further including the first nip roller 710 spaced apart from the first peeling roller 410 and engaged with the first roller 210 with the donor film 110 withdrawn by the first gripper 310 being interposed therebetween to support the withdrawn donor film 110, and rollers 910 serving as the first insertion means, in addition to the first roller 210 and the first peeling roller 410. In this case, the roller 910 serving as the first insertion means are disposed at opposite ends of the first peeling roller 410, and the first nip roller 710, the first peeling roller 410, and the roller 910 serving as the first insertion means interwork with each other through the first belt 810.

Figure 14:
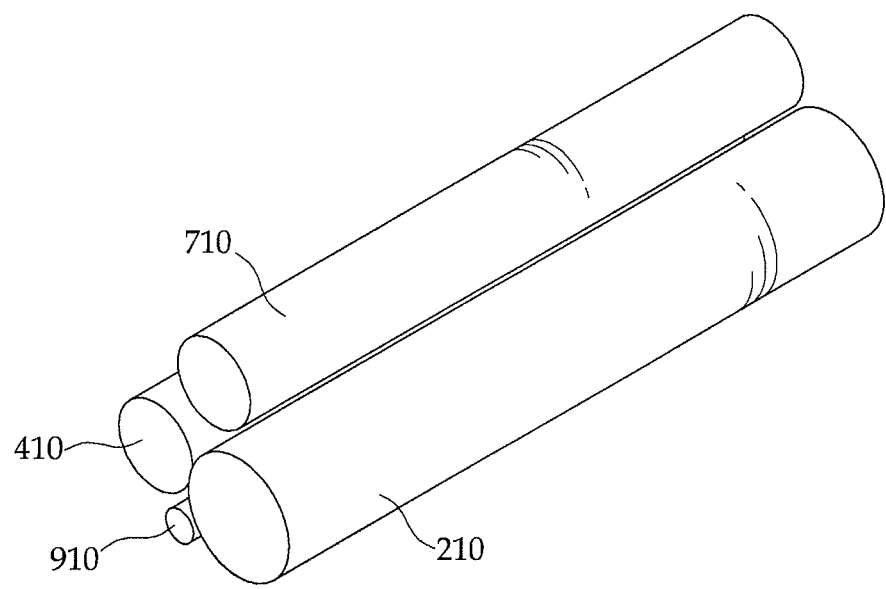
FIG. 14 illustrates a first roller, a first peeling roller, a first nip roller, and insertion means shaped like a roller.
Figure 15:
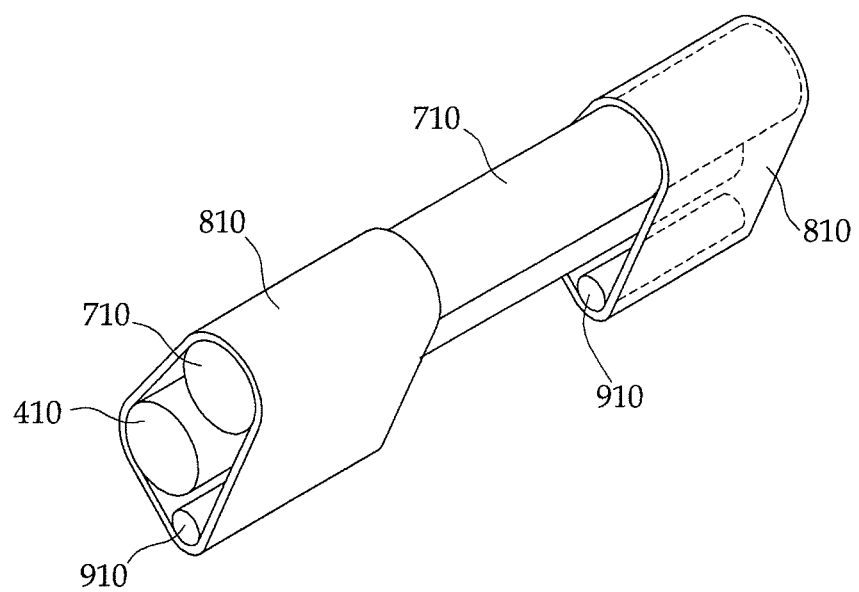
FIG. 15 illustrates an example of a first peeling roller, a nip roller, first insertion means shaped like a roller, and first belts formed only at parts corresponding to positions where the first insertion means are inserted.

FIG. 14 illustrates the first roller 210, the first peeling roller 410, the first nip roller 710, and the rollers 910 serving as the first insertion means. FIG. 15 illustrates a state in which the first nip roller 710, the first peeling roller 410, and the rollers 910 serving as the first insertion means interwork with each other through the first belts 810. The first belt 810 is formed only in a part corresponding to a width of the roller 910 serving as the first insertion means. The first nip roller 710 may be formed to have a length corresponding to that of the first peeling roller 410 (see FIG. 15) or may be formed only in a part corresponding to a position where the roller 910 serving as the first insertion means is inserted.

According to one embodiment, the donor film peeling apparatus further includes, in addition to the second roller 220 and the second peeling roller 420, the second nip roller 720 spaced apart from the second peeling roller 420 and engaged with the second roller 220 with the support 120 withdrawn by the second gripper 320 being interposed therebetween to support the withdrawn support 120. The rollers 920 serving as the second insertion means are disposed in the second peeling roller 420, and the second nip roller 720, the second peeling roller 420, and the roller 920 serving as the second insertion means interwork with each other through the second belt 820. In this case, the second belt 820 may be formed in a part corresponding to a width of the roller 920 serving as the second insertion means.

It is also possible to peel the donor film and the support, which are bonded to each other with the substrate being interposed therebetween, from the substrate through a method below.

First, a bonded body of the donor film and the support, which are bonded to each other with the substrate being interposed therebetween, is disposed between the first roller and the second roller. A distal end portion of the donor film is withdrawn by using the first gripper, and a distal end portion of the support is withdrawn using the second gripper from an end of the bonded body of the donor film and the support, which are bonded to each other with the substrate being interposed therebetween. The first peeling roller is disposed such that the first peeling roller is engaged with the first roller with the withdrawn donor film being interposed between the first peeling roller and the first roller, and the second peeling roller is disposed such that the second peeling roller is engaged with the second roller with the withdrawn support being interposed between the second first peeling roller and the second roller. The insertion means is inserted between the donor film and the support, the first roller and the second roller are rotated, the donor film and the support are withdrawn through the first gripper and the second gripper while the substrate is being carried, so that the donor film and the support are peeled from the substrate.

The process of peeling the donor film and the support from the substrate may be performed in a chamber. In this case, it does not matter if the first peeling roller and the second peeling roller are simultaneously disposed or if any one of them is disposed first. The first peeling roller and the second peeling roller may be disposed under a vacuum atmosphere, together with a subsequent step.

Further, rotation speeds of the first roller and the first peeling roller may correspond to a withdrawal speed of the donor film. Likewise, rotation speeds of the second roller and the second peeling roller may correspond to a withdrawal speed of the support.

According to at least one of the disclosed embodiments, the apparatus for peeling the donor film can substantially uniformly maintain a web angle, a peeling force, and a tension in peeling the donor film, peel the donor film in a vacuum state, and simultaneously peel upper and lower films.

In addition, the apparatus can solve a problem of generation of stains in a roll peeling and prevent tearing out of an EL and damage to an organic EL in a substrate from being caused by a sudden peeling operation, thereby preventing a peeling failure as well. Furthermore, a fixing means may be separately provided in each roller of the donor film peeling apparatus.

Although the above embodiments have been described with reference to the accompanying drawings, those skilled in the art will appreciate that various modifications, additions and substitutions are possible, without departing from the scope and spirit of the accompanying claims.

What is claimed is:

1. A method of peeling a donor film and a support, which are bonded to each other with a substrate being interposed therebetween, from the substrate, the method comprising:
    disposing the donor film and the support between a first roller and a second roller, wherein the donor film and the support are bonded to each other with the substrate being interposed therebetween;
    withdrawing an end portion of the donor film via a first gripper and withdrawing an end portion of the support via a second gripper from an end of a bonded body of the donor film and the support;
    engaging a first peeling roller with the first roller such that the withdrawn donor film is interposed therebetween;
    engaging a second peeling roller with the second roller such that the withdrawn support is interposed therebetween;
    inserting an insertion mechanism between the donor film and the support so as to separate the donor film and the support from the substrate;
    rotating the first and second rollers and withdrawing the donor film and the support via the first and second grippers, respectively to peel the donor film and the support from the substrate; and
    winding the donor film and the support onto a donor film winding roller and a support layer winding roller, respectively.

2. The method as claimed in claim 1, wherein the method is performed in a chamber.

3. The method as claimed in claim 1, wherein the engaging of the first peeling roller and the engaging of the second peeling roller are substantially simultaneously performed.

4. The method as claimed in claim 1, wherein the engaging of the first peeling roller and the engaging of the second peeling roller are performed under a vacuum atmosphere.

5. The method as claimed in claim 1, wherein at least one of a rotation speed of the first roller or a rotation speed of the first peeling roller corresponds to a withdrawal speed of the donor film.

6. The method as claimed in claim 1, wherein at least one of a rotation speed of the second roller or a rotation speed of the second peeling roller corresponds to a withdrawal speed of the support.

7. The method as claimed in claim 1, wherein the engaging of the first peeling roller and the engaging of the second peeling roller are sequentially performed.

8. The method as claimed in claim 1, wherein the insertion mechanism includes a first insertion mechanism and a second insertion mechanism.

9. The method as claimed in claim 8, wherein the first insertion mechanism and the second insertion mechanism contact each other.

* * * * *